United States Patent
Hobmeyr et al.

(10) Patent No.: US 7,155,916 B2
(45) Date of Patent: Jan. 2, 2007

(54) SUPPLY UNIT COOLING

(75) Inventors: Ralph Hobmeyr, Mainz-Kastel (DE); Dirk Wexel, Mainz-Kastel (DE); Robert Linden, Arvada, CO (US)

(73) Assignees: General Motors Corporation, Detroit, MI (US); Barber Nichols Inc., Arvada, CO (US)

( * ) Notice: Subject to any disclaimer, the term of this patent is extended or adjusted under 35 U.S.C. 154(b) by 433 days.

(21) Appl. No.: 10/675,006

(22) Filed: Sep. 30, 2003

(65) Prior Publication Data

US 2005/0066680 A1 Mar. 31, 2005

(51) Int. Cl.
*F25B 19/00* (2006.01)
*F25D 23/12* (2006.01)
*H01M 8/12* (2006.01)
*H01M 10/50* (2006.01)

(52) U.S. Cl. .............. 62/7; 62/259.2; 429/26; 429/120

(58) Field of Classification Search .............. 62/7, 62/259.2; 429/26, 120
See application file for complete search history.

(56) References Cited

U.S. PATENT DOCUMENTS

| | | | |
|---|---|---|---|
| 4,720,981 A * | 1/1988 | Helt et al. ................. | 62/113 |
| 6,312,842 B1* | 11/2001 | Reiser et al. .............. | 429/13 |
| 6,370,903 B1* | 4/2002 | Wlech ....................... | 62/324.6 |
| 6,562,503 B1* | 5/2003 | Grasso et al. .............. | 429/26 |
| 2001/0024617 A1* | 9/2001 | Ishigure et al. ............ | 417/372 |
| 2003/0029649 A1* | 2/2003 | Baumert et al. ........... | 180/54.1 |
| 2003/0041607 A1* | 3/2003 | Baumert et al. ........... | 62/199 |
| 2003/0064262 A1* | 4/2003 | Ballantine et al. ......... | 429/24 |
| 2003/0072981 A1* | 4/2003 | Imaseki et al. ............ | 429/13 |
| 2003/0087139 A1* | 5/2003 | White ........................ | 429/24 |
| 2004/0000161 A1* | 1/2004 | Khelifa et al. ............. | 62/324.1 |
| 2004/0001985 A1* | 1/2004 | Alva ........................... | 429/26 |
| 2004/0194497 A1* | 10/2004 | Sasaki et al. .............. | 62/505 |

* cited by examiner

*Primary Examiner*—William C. Doerrler
(74) *Attorney, Agent, or Firm*—Harness, Dickey & Pierce, P.L.C.

(57) ABSTRACT

A feed gas supply unit for a fuel cell system uses a feed gas supply and/or cooling fluid passages to cool the control unit, bearings, and motor of the feed gas supply device.

33 Claims, 7 Drawing Sheets

SUPPLY UNIT COOLING

FIELD OF THE INVENTION

The present invention relates to hydrogen supply units, and more particularly to cooling of a hydrogen supply unit.

BACKGROUND OF THE INVENTION

Feed gas supply units for fuel cell systems generally include a control unit and a drive unit. The control unit includes a controller housed in an air-cooled housing. The motor unit includes cooling fluid channels and is cooled by a cooling fluid such as water.

These traditional feed gas supply units retain several disadvantages. These disadvantages are particularly applicable to implementation of the feed gas supply units in automotive applications. For instance, the control unit reaches undesired temperatures within the warm motor room of the automobile which can encounter temperature increases up to 125° C. In particular, there is insufficient air flow within the motor room to flow through cooling fins of the control unit and adequately cool the control unit. As a result, electric losses and the chance of control unit failure increase.

With regard to the drive unit, the bearings of the motor unit are not adequately cooled. Operation of the bearings at undesired temperatures results in an increase in the chance of bearing failure. Bearing failure can result in malfunction of the feed gas supply unit or complete failure of the feed gas supply unit.

Further, compression of the feed gas within the feed gas supply unit results in a volume decrease and a corresponding temperature and pressure increase. The feed gas density directly effects regulation of the fuel cell system. Regulation of the fuel cell system becomes more difficult because of the increased density of the feed gas.

SUMMARY OF THE INVENTION

Accordingly, the present invention provides a supply device to circulate a fluid through a flow system. The supply device includes a control unit having a control housing defining a first channel in heat exchange relationship with a first cooling fluid flowing therethrough. A drive unit communicates with the control unit. The control unit controls operation of the drive unit. A supply unit is driven by the drive unit and induces fluid flow through the flow system.

In one feature, the first cooling fluid is water that draws heat from the control unit.

In another feature, the drive unit further comprises a drive housing defining a second channel in heat exchange relationship with a second cooling fluid flowing therethrough. The second cooling fluid is either water or a gas.

In still another feature, the supply unit includes a supply housing defining a third channel in heat exchange relationship with a third cooling fluid flowing therethrough. The third cooling fluid draws away heat generated by the supply unit. The third cooling fluid is water.

In yet another feature, the supply unit is a compressor including an impeller, a suction and a discharge. The suction is connected to the flow system. The impeller draws a fluid from the flow system into the supply unit through the suction. The discharge is connected to the flow system. The impeller pushes fluid from the supply unit into the flow system through the discharge.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. For purposes of clarity, the same reference numbers will be used in the drawings to identify similar elements.

Figure 1:
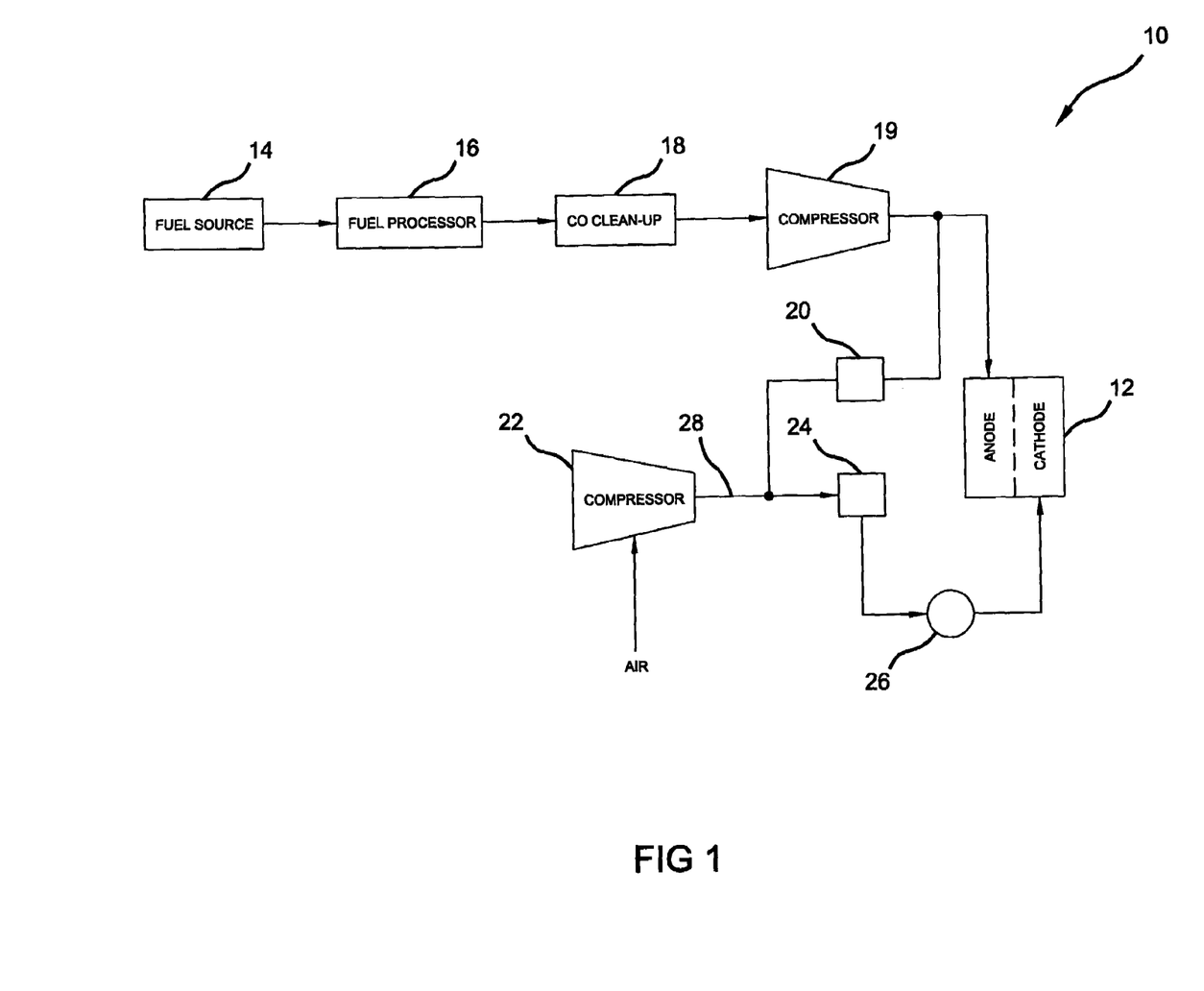
FIG. 1 is a functional block diagram of a fuel cell system including a hydrogen supply unit.

Referring now to FIG. 1, an exemplary fuel cell system 10 is shown and includes a fuel cell stack 12. The fuel cell system 10 includes a fuel source 14 that provides fuel. Example fuels include, methanol, gasoline or other hydrocarbon fuels. A fuel processor 16 catalytically dissociates the hydrocarbon fuel into a hydrogen-rich reformate or hydrogen-containing feed gas that includes $H_2$, $CO_2$, $H_2O$, and CO. The CO content of the feed gas is usually too high for use in the fuel cell stack 12. As a result, the feed gas is treated by a CO clean-up device 18. In an exemplary embodiment, the CO clean-up device 18 includes a water-gas shift (WGS) reactor and a preferential oxidization (PO) reactor, although other CO clean-up devices 18 can be used. The feed gas is circulated through the fuel cell system 10 by a compressor 19.

As a final CO clean-up measure, a small amount of oxygen-rich air can be fed into the feed gas by a metering device 20 prior to the fuel cell stack 12. The amount of air is generally less than 8% by volume. However, the amount of air may vary as design requirements dictate. The metering device 20 can include a variable orifice injector, a pulse-width modulated injector, a fixed displacement type injector or other suitable metering devices. Compressed air is provided to the metering device 20 by a compressor 22 and is heated by the heat of compression in the compressor 22.

Figure 7:
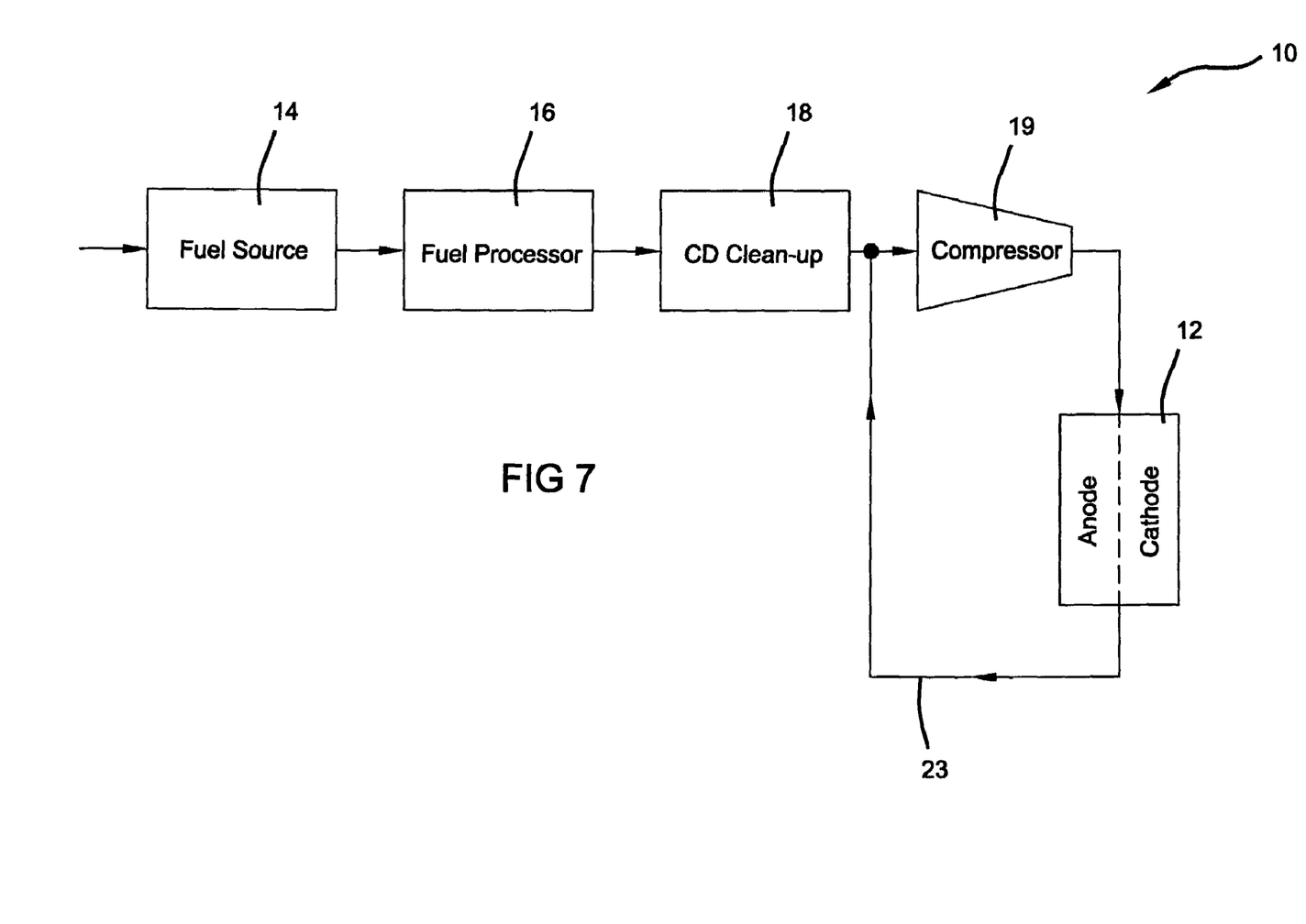
FIG. 7 is a functional block diagram of a fuel cell system including a hydrogen supply unit and a recirculation loop for the hydrogen mixture.

Alternatively, it is anticipated that the hydrogen-containing feed gas may be supplied directly from a hydrogen source (not shown). In such a case, the hydrogen-containing feed gas is provided as pure hydrogen ($H_2$). As a result, the fuel processor 16, CO clean-up device 18 and the metering device 20 are not required. Regardless of the manner in which the feed-gas is obtained, the feed gas is circulated through the fuel cell system 10 by a compressor 19 directly from the hydrogen source. As illustrated in FIG. 7, the system may also be provided with recirculation of the anode loop through a passage 23. The passage 23 transports the anode exhaust from the stack 12 to the compressor 19 which increases the pressure and returns the anode gas to the stack 12.

Oxidant is supplied to the fuel cell stack 12 to catalytically react with the feed gas. Typically, the oxidant is oxygen-rich air supplied by the compressor 22 through a humidifier 24. The humidified air is supplied to the fuel cell stack 12 through a regulator 26 to supply an appropriate air pressure.

Figure 2:
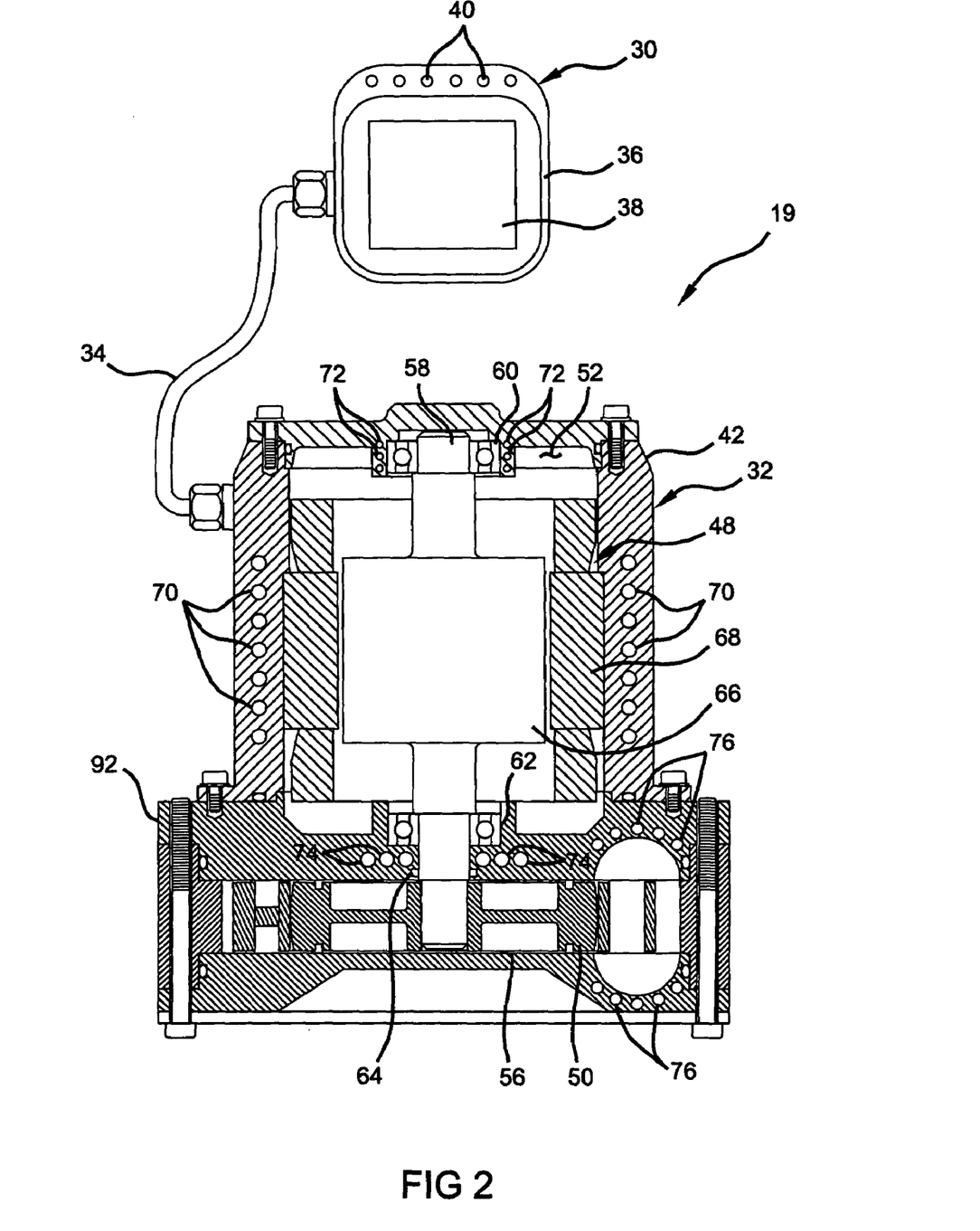
FIG. 2 is a cross-sectional view of a water-cooled hydrogen supply unit.

Referring now to FIG. 2, an embodiment of the compressor 19 is shown. The compressor 19 includes a control unit 30 and a drive unit 32. The control unit 30 communicates with the drive unit 32 by a cable 34. The control unit 30 includes a housing 36 that encloses a controller 38. A series of enclosed flow channels 40 are formed in walls of the housing 36. The drive unit 32 includes a housing 42, a motor 48 and an impeller 50. The housing 42 defines an interior 52, a series enclosed of flow channels and a compression chamber 56. The impeller 50 is located within the compression chamber 56. Feed gas is drawn into the compressor 19 through a suction inlet (not shown), is compressed within the compressor 19 and is discharged from the compressor 19 through a discharge outlet (not shown).

The motor 48 includes a shaft 58 rotatably supported within the housing 42 by bearings 60,62. The shaft 58 extends into the compression chamber 56 through a seal 64. The seal 64 prevents the feed gas compressed within the compression chamber 56 from leaking into the motor 48. A rotor 66 is fixed to the shaft 58 and is surrounded by a stator 68. The stator 68 is fixed to the housing 42. Current flowing through the stator windings induces eddy currents within the housing 42. The eddy currents induce rotation of the rotor 66 and the shaft 58. The impeller 50 is fixed for rotation with the shaft 58. The impeller 50 compresses the feed gas within the compression chamber 56 as the shaft 58 is induced to rotate.

The flow channels are formed through various "hot spot" areas of the housing 42. A first series of flow channels 70 are formed around and are in heat exchange relationship with the stator 68. Second and third series of flow channels 72,74, respectively, are formed around and are in heat exchange relationship with the bearings 60,62. A fourth series of flow channels 76 is formed along and are in heat exchange relationship with the compression chamber 56.

A cooling fluid flows through the flow channels to cool the associated components. Cooling fluid flowing through the flow channels 40 of the control unit 30 cool the control unit 30 and the controller 38 in particular. This enables the controller 38 to operate at an optimum temperature and maximum efficiency. Cooling fluid flowing through the first, second and third series of flow channels 70,72,74 cools the motor components. This enables an increase in the endurance of the motor components, in particular the bearings 60,62, and an increase in the overall motor efficiency. Cooling fluid flowing through the fourth series of flow channels 76 cools the compression process within the compression chamber 56. This enables improved regulation of the fuel cell system 10 by regulating the discharge temperature of the feed gas supplied to the fuel cell stack 12.

Additionally, because the cooling fluid is at a temperature above freezing (0° C.) the cooling fluid flow prevents freezing of the compressor 19 when operating in cold environments. Because of condensed water in the system, if one or more of the motor components freezes, rotation of the shaft 58 can be prohibited. In such an instance, the cooling fluid warms the frozen components to melt any ice that prevents shaft rotation.

Figure 3:
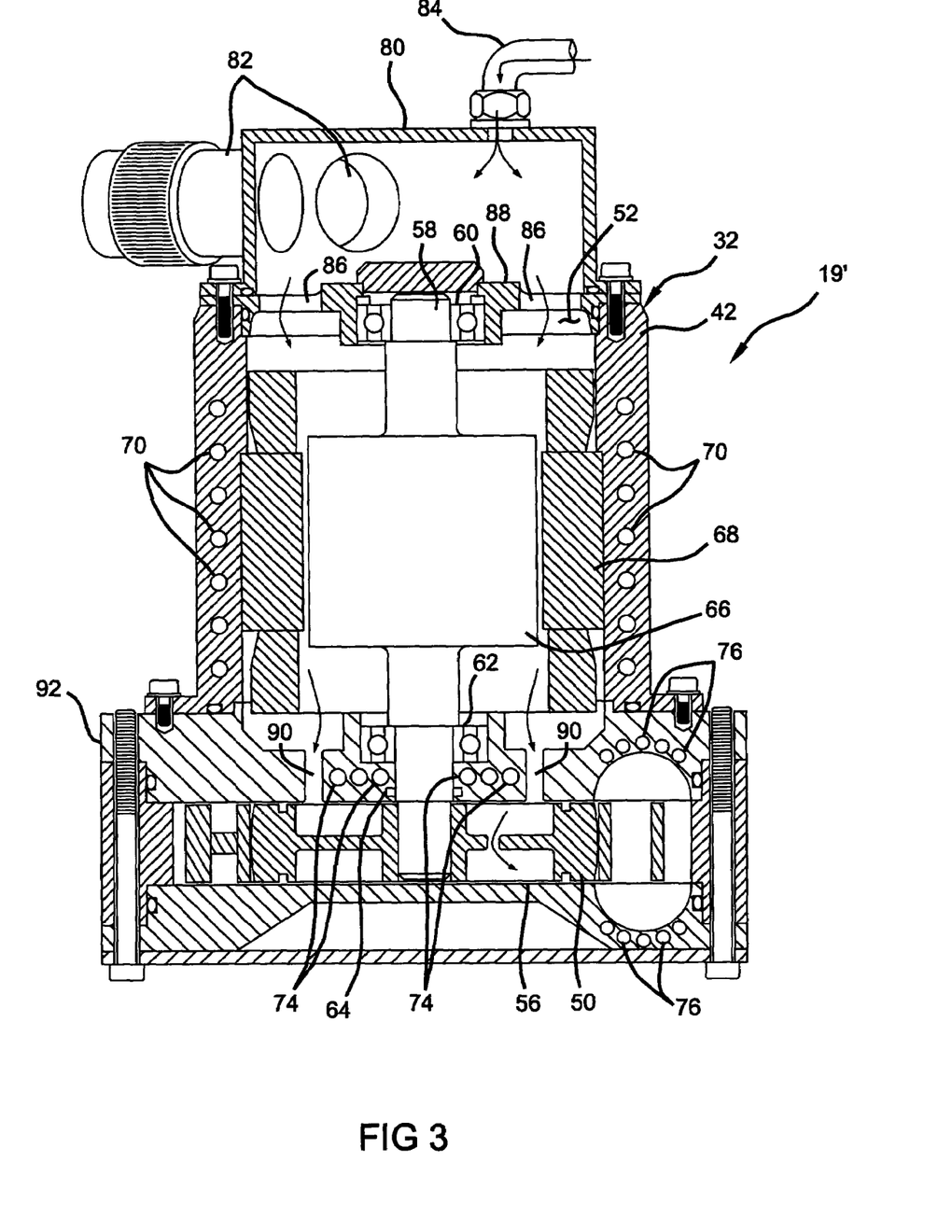
FIG. 3 is a cross-sectional view of a water and gas cooled hydrogen supply unit.
Figure 4:
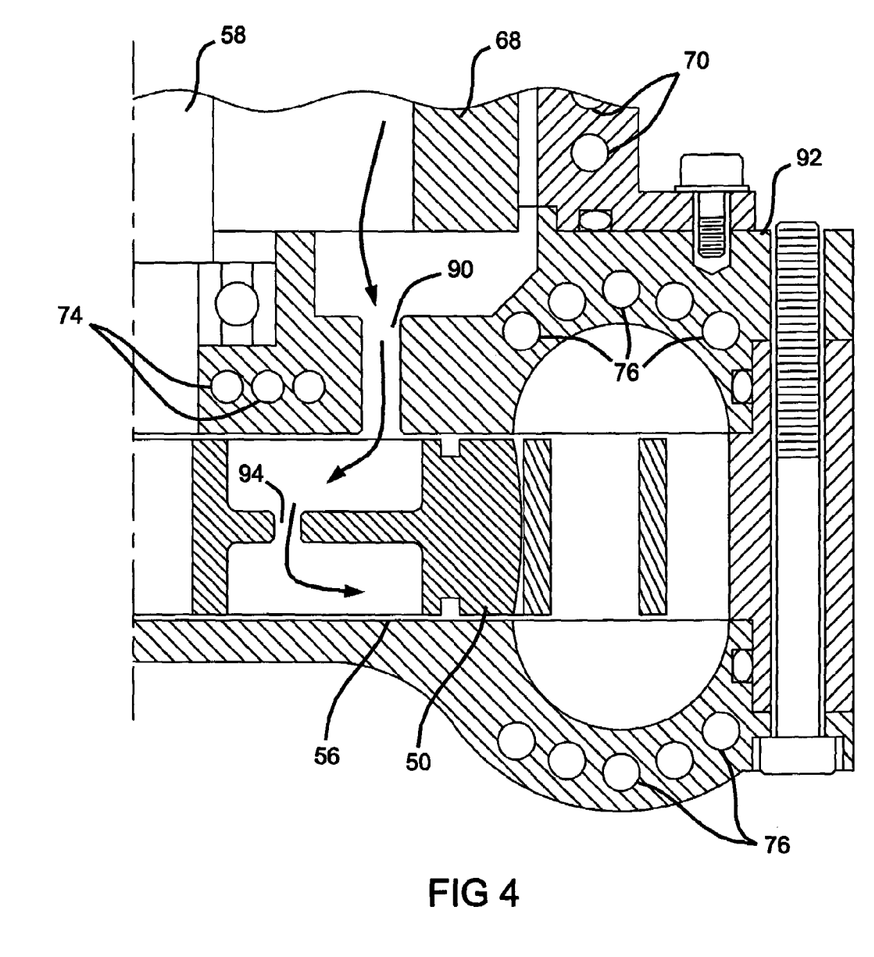
FIG. 4 is a detailed view of a portion of the hydrogen supply unit of FIG. 3.

Referring now to FIGS. 3 and 4, an alternative embodiment of the compressor is shown and is indicated as 19'. The drive unit 32 includes the housing 42, impeller 50, shaft 58, rotor 66 and stator 68. The drive unit further includes the flow channels 70 in heat exchange relationship with the stator 68, the flow channels 74 in heat exchange relationship with the bearing 62 and the flow channels 76 in heat exchange relationship with the compression chamber 56.

Additionally, the drive unit 32 includes a suction chamber 80 that has sealed electrical couplings 82, a gas inlet 84 and a set of ports 86 formed through an end plate 88 of the housing 42. The sealed electrical couplings 82 provide a sealed route for wires that enable communication with the control unit 30. The gas inlet 84 is in fluid communication with the feed gas source. That is to say, the gas inlet 84 functions as the suction of the compressor 19'. The ports 86 enable fluid communication between the suction chamber 80 and the interior 52 of the housing 42. Another set of ports 90 is formed in an end plate 92 of the housing 42. The end plate 92 separates the compression chamber 56 from the rest of the drive unit 32. However, the ports 90 enable fluid communication between the compression chamber 56 and the rest of the drive unit 32. A port 94 in the impeller 50 enables further communication with the compression chamber 56. The ports 90 also allow condensed water to drain back into the loop rather than gather in the motor compartment.

In operation, the compressor 19' compresses the feed gas creating a suction pressure. The suction pressure induces a feed gas flow through the gas inlet 84 and into the suction chamber 80. Alternately, the feed gas supply has a higher pressure and presses the feed gas through the pump. The feed gas flows through the components of the drive unit 32 drawing away heat as it passes. More particularly, the feed gas cools the bearings 60,62, the rotor 66, the stator 68 and the compression chamber 56 itself. The feed gas is ultimately drawn into the compression chamber 56 through the ports 90 and 94. The feed gas is compressed within the compression chamber 56 and discharged from the compressor 19'.

The feed gas can include either pure hydrogen or hydrogen mixed with other gases that are inert and will not damage the fuel cell system 10. Exemplary gases include nitrogen, argon, helium and xenon. The feed gas has a relatively high heat capacity. For example, the heat capacity of hydrogen is approximately 14.05 kJ/kg ($c_p$=14.05 kJ/kg). As a result, even a slight feed gas flow cools the drive unit components. The feed gas, however, is not constantly circulated through the fuel cell system 10. As a result, a majority of the cooling process is still achieved via the cooling fluid flowing through the flow channels. Thus, the cooling fluid mainly cools the drive unit components with the feed gas providing an auxiliary cooling function.

Figure 5:
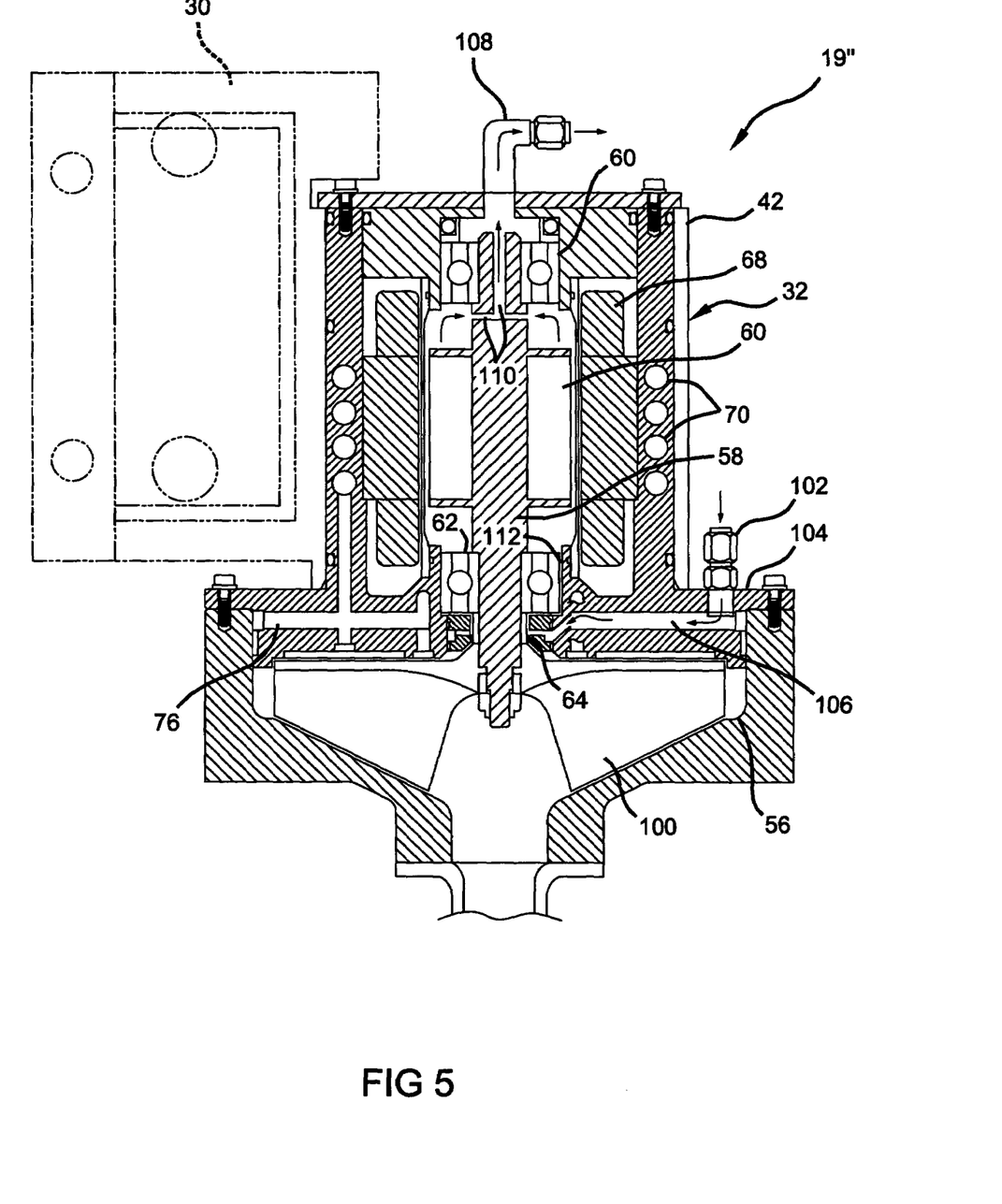
FIG. 5 is a cross-sectional view of a water and gas cooled hydrogen supply unit having a controller attached thereto.
Figure 6:
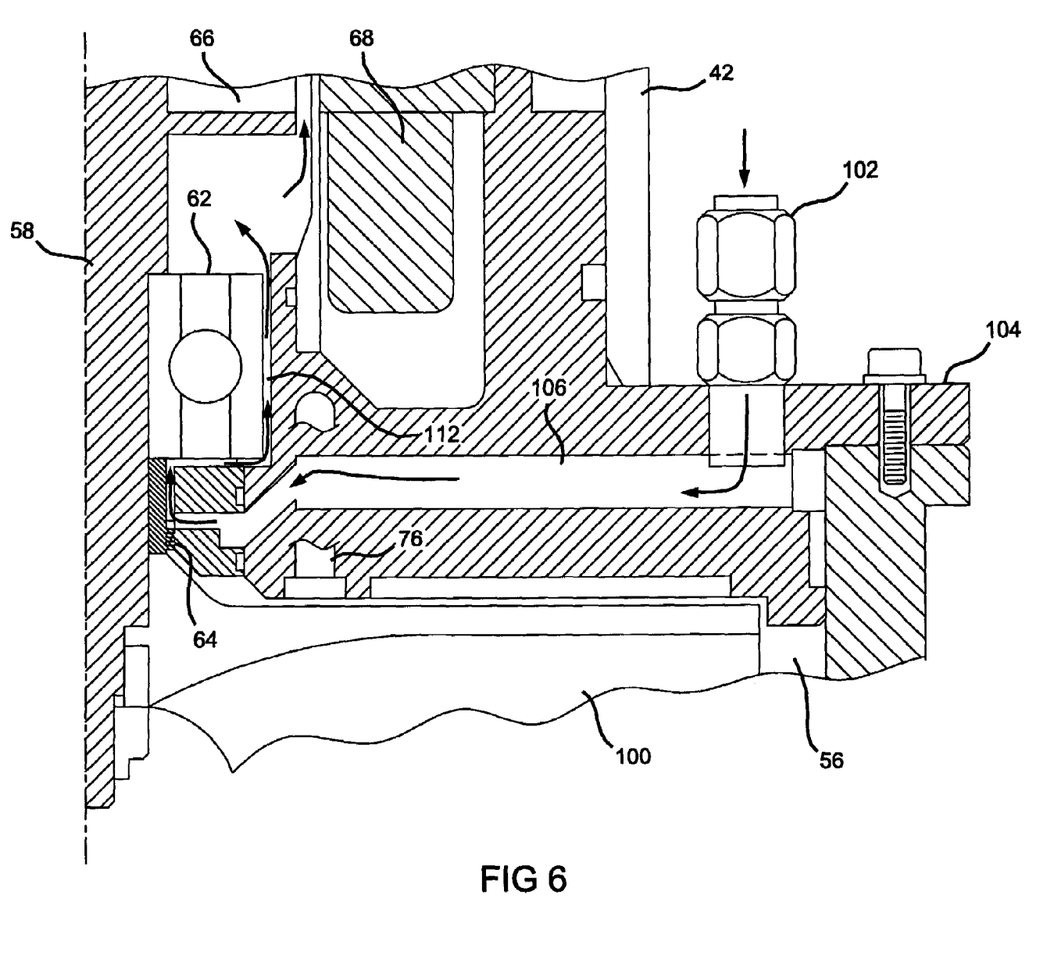
FIG. 6 is a detailed view of a portion of the hydrogen supply unit of FIG. 5.

Referring now to FIGS. 5 and 6, yet another alternative embodiment of the compressor is shown and is indicated as 19". The compressor 19" is a turbo-compressor and includes the housing 42, the shaft 58, the rotor 66, the stator 68 and a turbo-impeller 100 disposed within the compression chamber 56. The drive unit 32 further includes the flow channels 70 in heat exchange relationship with the stator 68 and the flow channels 76 in heat exchange relationship with the compression chamber 56. The compressor 19" also includes the seal 64 to prevent leakage of compressed gas into the motor area. The seal 64 is depicted as a labyrinth seal (best seen in FIG. 6), however, it is appreciated that any appropriate seal can be implemented. The control unit 30 (shown in phantom) is optionally attached directly to the compressor 19".

A gas inlet 102 is disposed through a base 104 of the compressor 19" and communicates with flow channels 106. A gas outlet 108 extends from the end plate of the compressor 19". The shaft 58 includes bores 110 that enable fluid communication to the gas outlet 108. As best seen in FIG. 6, a series of cooling channels 112 are formed about the bearing 62.

The gas inlet 102 communicates with the source of the hydrogen-containing feed gas. The gas outlet 108 communicates with the suction side of the compressor 19". Feed gas flows through the gas inlet 102, the flow channels 106, around the bearing 62 through the cooling channels 112, through the interior of the motor, through the bores 110 and out through the gas outlet 108. Part of the feed gas also flows through the seal 64 into the compression chamber 56. In this manner, the feed gas cools the compression chamber 56, the bearings 60,62, the rotor 66 and the stator 68. In short, the motor unit 32 makes up a portion of the flow circuit between the feed gas source and the compression chamber 56.

In operation, the feed gas pressure at the gas inlet 102 is higher than in the compressor unit 56 and outlet 108. The feed gas flows through the components of the drive unit 32 as described above, drawing away heat as it passes. Additionally, the feed gas flow carries away air that may have collected inside the drive unit, as described above with regard to the compressor 19'. After exiting the drive unit 32, the feed gas is preferably filtered prior to entering the suction side of the compressor 19". The feed gas is compressed in the compression chamber and supplied to the fuel cell stack 12.

As described above with regard to the compressor 19', the feed gas is not constantly circulated through the fuel cell system 10. As a result, a majority of the cooling process is still achieved via the cooling fluid flowing through the flow channels. Thus, the cooling fluid mainly cools the drive unit components with the feed gas providing an auxiliary cooling function.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A supply device to circulate a fluid through a flow system, comprising:
   a control unit having a control housing defining a first enclosed channel formed in a wall of said control housing and in heat exchange relationship with a cooling fluid flowing therethrough;
   a drive unit including a drive housing defining a second channel in heat exchange relationship with said cooling fluid flowing therethrough, said drive unit in electrical communication with said control unit, said control unit controlling operation of said drive unit; and
   a supply unit that is driven by said drive unit and configured to circulate said fluid flow through said flow system, said fluid flow circulated by said supply unit including said cooling fluid, wherein said supply unit includes a supply housing defining a third channel in heat exchange relationship with said cooling fluid flowing therethrough, said cooling fluid drawing away heat generated by said supply unit.

2. The supply device of claim 1 wherein said control unit includes a controller that generates heat.

3. The supply device of claim 1 wherein said cooling fluid draws heat from said control unit.

4. The supply device of claim 1 wherein said drive unit generates heat that is drawn from said drive unit by said cooling fluid.

5. The supply device of claim 1 wherein said cooling fluid is a liquid.

6. The supply device of claim 1 wherein said cooling fluid is a gas.

7. The supply device of claim 1 wherein said drive unit includes an electric motor having a shaft interconnected to said supply unit.

8. The supply device of claim 1 wherein said supply unit is a compressor comprising:
   an impeller;
   a suction that is connected to said flow system, said impeller drawing a fluid from said flow system into said supply unit through said suction; and
   a discharge that is connected to said flow system, said impeller pushing fluid from said supply unit into said flow system through said discharge.

9. A supply device to circulate a flow of hydrogen through a fuel cell system, comprising:
   a control unit having a control housing defining a first enclosed channel in heat exchange relationship with a cooling fluid flow;
   a drive unit having a drive housing defining a second channel in heat exchange relationship with said cooling fluid flow, said control unit controlling operation of said drive unit; and
   a compressor unit that is driven by said drive unit and induces hydrogen flow through said fuel cell system.

10. The supply device of claim 9 wherein said cooling fluid is a liquid.

11. The supply device of claim 9 wherein said cooling fluid is a gas.

12. The supply device of claim 9 wherein said control unit includes a controller that generates heat.

13. The supply device of claim 9 wherein said cooling fluid flowing through said first channel draws heat from said control unit.

14. The supply device of claim 9 wherein said drive unit includes an electric motor having a shaft interconnected to said compressor unit.

15. The supply device of claim 9 wherein said compressor unit includes a supply housing defining a third channel in heat exchange relationship with said cooling fluid, said cooling fluid drawing away heat generated by said compressor unit.

16. The supply device of claim 15 wherein said cooling fluid is a liquid.

17. The supply device of claim 9 wherein said compressor unit comprises:
   an impeller;
   a suction that is connected to said fuel cell system, said impeller drawing hydrogen from said fuel cell system into said compressor unit through said suction; and
   a discharge that is connected to said fuel cell system, said impeller pushing hydrogen from said compressor unit into said fuel cell system through said discharge.

18. The supply device of claim 9 wherein said control unit is mounted to said drive housing, said control unit in heat exchange relationship with said cooling fluid flow.

19. The supply device of claim 9 wherein said drive unit defines a fourth channel in heat exchange relationship with said cooling fluid flow.

20. A fuel cell system including a hydrogen flow circuit, comprising:
a supply device circulating hydrogen through said hydrogen flow circuit, said supply device comprising:
a control unit having a control housing defining a first enclosed channel in heat exchange relationship with a cooling fluid flowing therethrough;
a drive unit including a drive housing defining a second channel in head exchange relationship with said cooling fluid flowing therethrough, said drive unit in electrical communication with said control unit, said control unit controlling operation of said drive unit;
a supply unit that is driven by said drive unit and induces hydrogen flow through said hydrogen flow circuit; and
a fuel cell stack that receives said hydrogen flow.

21. The fuel cell system of claim 20 wherein said cooling fluid is a liquid.

22. The fuel cell system of claim 20 wherein said cooling fluid draws heat from said control unit.

23. The fuel cell system of claim 20 wherein said drive unit generates heat that is drawn from said drive unit by said cooling fluid.

24. The fuel cell system of claim 20 wherein said cooling fluid is a gas.

25. The fuel cell system of claim 20 wherein said drive unit includes an electric motor having a shaft interconnected to said supply unit.

26. The fuel cell system of claim 20 wherein said control unit is attached to said drive housing, said control unit in heat exchange relationship with said cooling fluid flow.

27. The fuel cell system of claim 20 wherein said supply unit includes a supply housing defining a third channel in heat exchange relationship with said cooling fluid flowing therethrough, said cooling fluid drawing away heat generated by said supply unit.

28. The fuel cell system of claim 27 wherein said cooling fluid is a liquid.

29. The fuel cell system of claim 20 wherein said supply unit is a compressor comprising:
an impeller;
a suction that is connected to said hydrogen flow circuit, said impeller drawing a fluid from said hydrogen flow circuit into said supply unit through said suction; and
a discharge that is connected to said hydrogen flow circuit, said impeller pushing fluid from said supply unit into said hydrogen flow circuit through said discharge.

30. The fuel cell system of claim 20, wherein said drive unit further comprises a drive housing defining a second channel in heat exchange relationship with said cooling fluid flowing therethrough and a third channel in heat exchange relationship with said cooling fluid flowing therethrough.

31. The fuel cell system of claim 30 wherein said cooling fluid is a liquid.

32. The fuel cell system of claim 30 wherein said cooling fluid is a gas.

33. The fuel cell system of claim 20, wherein said hydrogen flow induced by said supply unit includes said cooling fluid.

* * * * *